Figure 1:
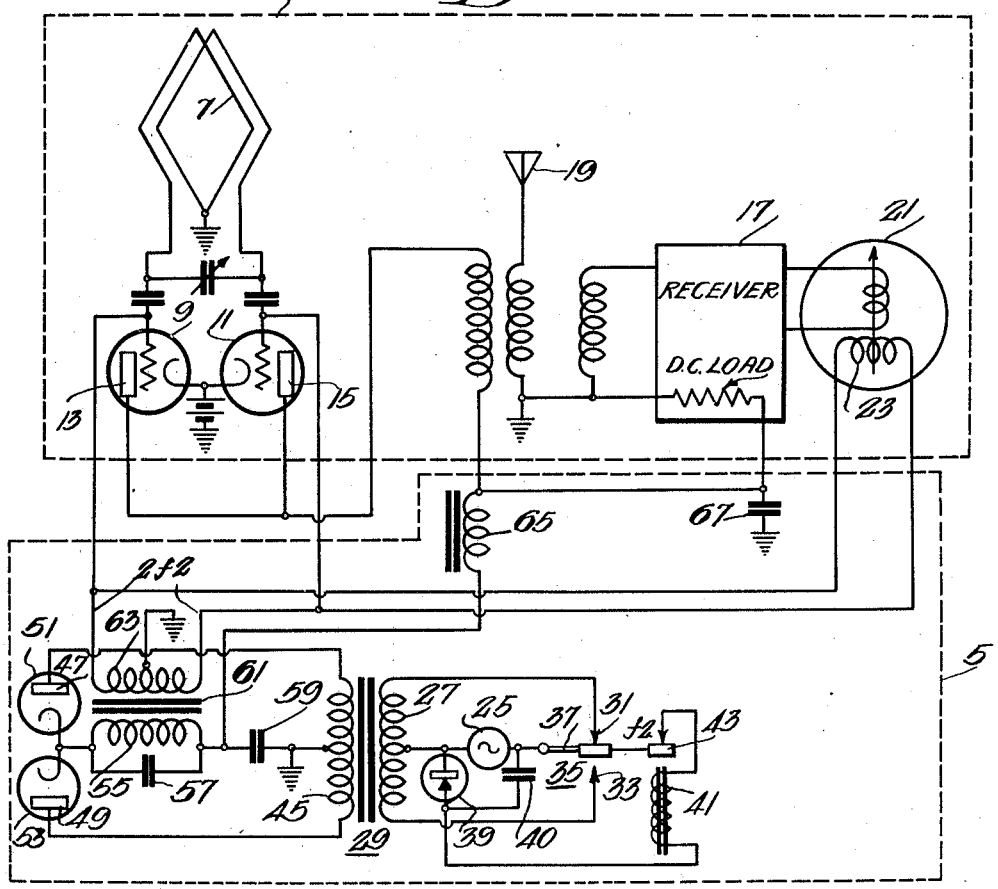

Oct. 28, 1941.    D. S. BOND    2,260,930

CONSTANT FREQUENCY POWER SUPPLY SYSTEM

Filed Nov. 24, 1939

INVENTOR
Donald S. Bond
BY
ATTORNEY

Patented Oct. 28, 1941

2,260,930

UNITED STATES PATENT OFFICE 2,260,930

CONSTANT FREQUENCY POWER SUPPLY SYSTEM

Donald S. Bond, Philadelphia, Pa., assignor to Radio Corporation of America, a corporation of Delaware Application November 24, 1939, Serial No. 305,783

6 Claims. (Cl. 171—97)

This invention relates to constant frequency power supply systems, and more particularly to a method of and means for utilizing a source of energy of uncontrolled or variable frequency to supply energy at a constant frequency which may be different from the average frequency of the source.

It will be recognized that it is frequently necessary to obtain a source of power of substantially constant frequency for the operation of various radio devices. It frequently happens that the only available source of power either is of a frequency unsuited to the particular use intended, or that the frequency of the source is unregulated. I am aware that regulated non-synchronous motor generators may be used to convert the source of energy to any desired stable frequency, but it is the principal object of this invention to accomplish this general purpose with a device which is of small size and weight, and is therefore adapted for use in aircraft and the like.

Airplane manufacturers are beginning to equip their craft with high frequency power generators in order to permit a reduction in the weight of power-operated equipment. The weight of the iron used in transformers, motors and the like can be appreciably reduced by increasing the frequency of the main power generator to 800 cycles per scond, for example, as compared to the weight of iron required for use with a power source of 60 cycles per second. While this high frequency has no harmful effects on the normal ignition, lighting and other apparatus of the craft, it does present a problem in connection with certain radio equipment. For example, the left-right indicator described in U. S. Patent No. 2,054,160, issued September 15, 1936, to A. Leib, utilizes a mechanical switching system for reversing the input and output circuits. The switching is synchronously operated at a low frequency by an alternating current source. Thermionic switching is also known in which an alternating switching voltage is superimposed on the control electrodes of a pair of switching tubes connected in the loop antenna circuit. In each case, the switching frequency is preferably below the range of audio frequencies used for voice communication. Where such a system is to be used, therefore, it becomes necessary to obtain from the 800-cycle power supply other power of a lower constant frequency.

In addition to converting the high frequency source to a suitable constant low frequency, it is a further object of this invention to obtain at the same time a direct current suitable for operating the radio receiver itself, or other equipment requiring a similar D. C. supply. Other objects of this invention as well as a more complete understanding of its nature and operation will be obtained from the following specification when considered in connection with the accompanying drawing, and its scope is indicated by the appended claims.

Figure 2:
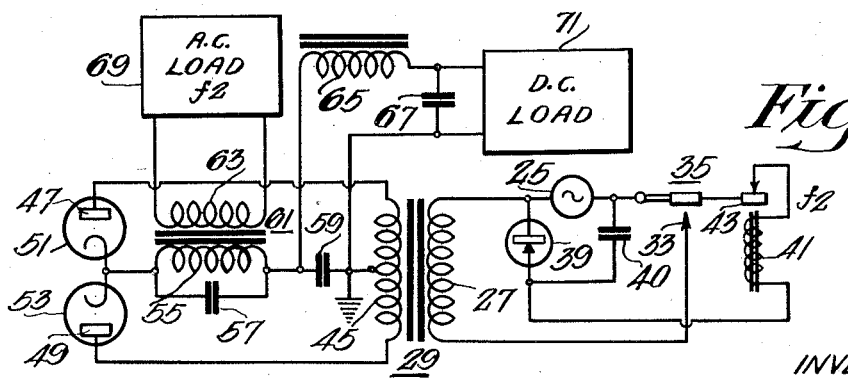

Referring to the drawing, Figure 1 is a circuit diagram of a preferred embodiment of this invention, and Figure 2 is a modification thereof. Similar numerals will be applied to similar elements.

Referring to Fig. 1, a left-right indicator of a type well known to those skilled in the art is indicated by the apparatus within the box 3, while a power supply system for deriving an alternating current of a constant frequency and a direct current from a prime power source of arbitrary frequency is indicated by the apparatus within box 5.

Referring first to the direction finder, a directional loop antenna 7 is connected to the control electrodes of a pair of keyed amplifier tubes 9 and 11. The amplifier plates 13, 15 are coupled to the input of a receiver 17. Energy from a non-directional antenna 19 is likewise coupled to the receiver input. An indicating meter 21 is connected to the receiver output. The phasing of the meter is reversed by means of a coil 23 which is energized by a source of alternating current, the same source being also applied to the control electrodes of the amplifier tubes 9 and 11. As is well known, the amplifier tubes are alternately "keyed," or made conductive, thus alternately impressing on the receiver radio frequency energy from the two halves of the loop antenna. When combined with the energy from the non-directional antenna, the resultant horizontal directivity pattern of the antennas is similar to two oppositely positioned overlapping cardioids. Rotation of the loop antenna with respect to the transmitter produces a corresponding deviation of the meter 21.

The power supply system includes a generator 25 which represents the prime power source of the aircraft. The frequency $f_1$ of this generator is of the order of 800 cycles per second, although, so far as the present invention is concerned, it may be almost any frequency, and may, in fact, vary within wide limits. One terminal of the generator is connected to the center tap of the primary 27 of a step-up transformer 29. The outer terminals of the primary winding are connected to two oppositely positioned contact points 31 and 33 of a vibrator 35, the contact arm 37 of which is connected to the remaining terminal of the prime power generator 25.

The vibrator may be energized in the customary manner by means of a battery connected in series with an electromagnet 41 and a switch 43, but in order to conserve space and weight, the vibrator is preferably operated by power derived directly from the generator source. This is accomplished by connecting a small copper-oxide rectifier 39 and a capacitor 40 in series across the generator terminals, as illustrated. The vibrator arm itself is weighted or tuned so as to give it the frequency of vibration necessary to produce the desired output frequency. The output frequency is directly dependent upon the vibrator frequency, and if extreme constancy is desired, the vibrator arm may be compensated for temperature changes.

The center tap of the high voltage secondary 45 of transformer 29 is grounded. The outer terminals are connected to the anode electrodes 47, 49 of a pair of rectifiers 51, 53, respectively. The rectifier cathode electrodes are connected to ground through a circuit including an inductor 55, a capacitor 57 connected in parallel, and a by-pass capacitor 59. Inductor 55 is the primary of an audio frequency transformer 61, which is tuned to the frequency of the vibrator, or some harmonic thereof. Alternating voltage of the desired constant frequency is available across the terminals of the secondary 63 of transformer 61. This voltage is applied to the keyed amplifier tubes 9 and 11 and also to the phasing coil 23 of the output meter 21. The circuit is completed by a connection from the rectifier cathodes through primary 55 of the transformer 61, to the B+ lead of the receiver. The direct voltage path for the rectifiers 51 and 53 is completed through the receiver, which is represented by the resistor "D. C. load." A filter choke 65 and by-pass capacitor 67 are used to filter the alternating components from the D. C. lead.

The arrangement illustrated in Fig. 1 may be likened to a balanced modulator in which the current from the prime generator 25 is a carrier of constant amplitude and of frequency $f1$, modulated at the vibrator frequency $f2$. As a result of the balanced circuit, side band frequencies $f1+f2$ and $f1-f2$ are present in the secondary, the constant carrier frequency $f1$ being suppressed. After rectification in the secondary circuit, the frequency of the principal current is equal to the difference between the two side bands, $2f2$. This is the frequency to which the resonant circuit comprising inductor 55 and capacitor 57 is tuned, although higher harmonics are also present and may be selected if desired. Thus, the output frequency is entirely independent of the frequency of the prime generator 25, and yet all the power is derived from the prime generator.

It is to be noted that in addition to deriving a controlled alternating frequency current, a high voltage direct current is produced by the step-up transformer and rectifier, and that this direct current is available to operate the receiver. The system, therefore, has double utility.

A modification of this invention is illustrated in Fig. 2 which is useful where it is desired to make the output frequency the same as the frequency of the vibrator. In this case, the balanced primary circuit is not used, and the prime generator 25 is connected in series with the entire primary winding 27 of transformer 29 when the vibrator closes the circuit to contact point 33. In this case the frequencies of the secondary currents are $f1$ and $f1 \pm f2$, and after rectification the vibrator frequency $f2$ is produced. The A. C. load 69 is operated by this constant frequency. The D. C. load 71, as before, is supplied with direct current from the same rectifier circuit.

While this invention has been described in connection with a left-right indicator to which it is especially adapted, it is applicable to other devices which require a source of direct current and a source of alternating current of constant frequency, where the available power source is not of the desired frequency, nor of the desired constancy.

I claim as my invention:

1. A device of the character described comprising a power source for generating currents of a first frequency, means for modulating said currents at a second unrelated frequency, and means for deriving from said modulated currents direct currents and currents having a frequency related to said second frequency, respectively, whereby said power source supplies power at a frequency other than the frequency of said source.

2. A frequency converter comprising an alternating frequency generator, a transformer having primary and secondary windings, means for connecting said generator to said primary winding and including means for periodically reversing the phase of said connections, a rectifier connected to said secondary winding, and means in circuit with said rectifier for deriving currents related to the frequency of said periodic reversal and for deriving direct currents.

3. A frequency converter comprising an alternating frequency generator, a transformer having primary and secondary windings, means for connecting said generator to said primary winding and including means for periodically reversing the phase of said connections, a rectifier connected to said secondary winding, and resonant means in circuit with said rectifier for deriving currents of a frequency related to the frequency of said periodic reversal, and means for deriving direct currents from said rectifier.

4. In a device of the character described, an alternating current generator the frequency of which is subject to change, control means for periodically interrupting said alternating current at a constant rate, means for deriving combination frequency currents from said interrupted alternating currents, and means for deriving from said combination currents output currents related to the frequency of said interruption, and means for deriving direct currents from said combination frequency currents.

5. A device for obtaining constant frequency currents from a source of current of uncontrolled frequency which includes means for periodically interrupting said currents of uncontrolled frequency at a constant rate, means for deriving combination frequency currents from said interrupted currents, means for rectifying said combination frequency currents, and means for deriving constant frequency alternating currents from said rectifying means, whereby energy having constant frequency is derived from said source of energy of uncontrolled frequency.

6. In a device of the character described, the combination which includes a source of power of uncontrolled frequency, a vibrator for periodically modulating said currents of uncontrolled frequency at a constant rate, means for deriving combination frequency currents from said interrupted currents, means for rectifying said combination frequency currents, and means for deriving constant frequency alternating currents from said rectifying means, whereby energy having constant frequency is derived from said source of energy of uncontrolled frequency.

DONALD S. BOND.